(12) United States Patent  
Jordan et al.

(10) Patent No.: US 12,403,553 B1
(45) Date of Patent: Sep. 2, 2025

(54) MULTI-PURPOSE PULLER

(71) Applicant: IHLE FABRICATIONS, LLC, Polk City, IA (US)

(72) Inventors: Richard Jordan, Huxley, IA (US); Mike Ihle, Polk City, IA (US)

(73) Assignee: IHLE FABRICATIONS, LLC, Polk City, IA (US)

( * ) Notice: Subject to any disclaimer, the term of this patent is extended or adjusted under 35 U.S.C. 154(b) by 0 days.

(21) Appl. No.: 19/002,328

(22) Filed: Dec. 26, 2024

(51) Int. Cl.
*B23P 19/00* (2006.01)
*B23P 19/02* (2006.01)

(52) U.S. Cl.
CPC .................. *B23P 19/025* (2013.01)

(58) Field of Classification Search
CPC ...... B66F 9/18; B66F 9/06; B66F 9/12; B23P 19/025
See application file for complete search history.

(56) References Cited

U.S. PATENT DOCUMENTS

| | | | | |
|---|---|---|---|---|
| 3,396,862 A * | 8/1968 | Fischer | ................... | B66F 9/061 |
| | | | | 212/203 |
| 3,587,893 A * | 6/1971 | Laken | ..................... | B66F 9/061 |
| | | | | 414/640 |
| 3,788,492 A * | 1/1974 | Kraft | ....................... | B66F 9/061 |
| | | | | 212/292 |
| 5,127,638 A * | 7/1992 | Kent | ......................... | B66F 9/18 |
| | | | | 254/133 R |
| 5,692,583 A * | 12/1997 | Reed | ........................ | B66F 9/12 |
| | | | | 414/607 |
| 6,135,701 A * | 10/2000 | Galloway, Sr. | ........... | B66F 9/18 |
| | | | | 280/415.1 |
| 10,214,401 B2 * | 2/2019 | Brunckhorst | ............ | B66F 9/18 |
| 10,538,420 B1 * | 1/2020 | Kuebler | ................... | B60D 1/28 |
| 11,241,922 B2 * | 2/2022 | Altman | ..................... | B66F 9/18 |
| 2011/0226556 A1 * | 9/2011 | Balcom | ..................... | B66F 9/12 |
| | | | | 29/428 |
| 2023/0166907 A1 * | 6/2023 | Clevenger | ................ | B66F 9/18 |
| | | | | 414/749.1 |

OTHER PUBLICATIONS 3-in-1 Forklift Mounted Hitch, Product Manual [online], Titan Attachments, 2023. Retrieved from the Internet: <URL:https://3642276.app.netsuite.com/core/media/media.nl?id=26597039&c=3642276&h=08nrxpz-UH7BVAUmE251Gv3kqmFx9yCu_I_D2dtesKQGL9ib&_xt=.pdf>, 5 pages.

VEVOR Forklift Mobile Crane 6000lbs/3T Capacity, Forklift Crane Attachment 2 Hooks, Forklift Lifting Hoist w/ Truss Jib Boom, Forklift Extension, Forklift Boom Attachment Towing Handling Equipment, Product Information [online], VEVOR, 2024 [retrieved on Oct. 20, 2024]. Retrieved from the Internet: <URL:https://www.vevor.com/forklift-mobile-crane-c_10413/forklift-mobile-crane-forklift-crane-attachment-6000lbs-lifting-hoist-jib-boom-p_010365481709>, 5 pages.

* cited by examiner

*Primary Examiner* — Lee D Wilson
(74) *Attorney, Agent, or Firm* — McKee, Voorhees & Sease, PLC

(57) ABSTRACT

A multipurpose puller includes a frame, the frame having at least a pair of pockets parallelly arranged with one another, a chain having a threaded link that are capable of securing the multipurpose puller to a machine part, a linear motion device that is fixed to the frame, the linear motion device being used to rotate a plate containing a bearing and a shaft forward and backward about a pin.

18 Claims, 16 Drawing Sheets

MULTI-PURPOSE PULLER

TECHNICAL FIELD

The present disclosure relates generally to agricultural machinery. More particularly, but not exclusively, the present disclosure relates to a multipurpose puller for removing heavy parts from agricultural machinery such as a rotor.

BACKGROUND

The background description provided herein gives context for the present disclosure. Work of the presently named inventors, as well as aspects of the description that may not otherwise qualify as prior art at the time of filing, are neither expressly nor impliedly admitted as prior art.

Agricultural equipment and its parts can be large, heavy, and awkward. Traditionally, farmers and mechanics would remove parts such as a combine rotor using chains, block and tackles, forklift fork extensions, and other things which are crude and dangerous. When attempts are made to remove these heavy parts with crude methods or homemade tools, the parts being removed risk irreparable damage and the people performing the task risk injury and death.

Removing these heavy parts from the machine for routine maintenance and replacement can also require a lot of time.

Thus, there exists a need in the art for a multipurpose puller which makes the process of removing heavy agricultural attachments from large agricultural machines safer, easier, and more efficient.

SUMMARY

The multipurpose puller differs from other tools and implements through the ability to interchange attachments more efficiently. Pullers built prior to the present multipurpose puller were made to remove only combine rotors. An endless list of attachments for different agricultural equipment parts can be manufactured to fit this unit. A multitude of attachments for various parts can conveniently be swapped for whatever the job requires. This unit also has the ability to lock the shaft in twelve places rotationally, e.g., at twelve rotational locations radially and symmetrically arranged about the spindle to create positions at 12 o'clock, 1 o'clock, etc. This means that while the part is attached to the attachment, the part can be spun to a desired orientation and a pin can quickly be engaged to stop the shaft from rotating.

The following objects, features, advantages, aspects, and/or embodiments are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present disclosure to improve on or overcome the deficiencies in the art.

It is a further object, feature, and/or advantage of the present disclosure to enable the removal of a rotor to be much quicker and easier and decreases the risk of damage to the parts and machine as well as the personnel performing the repair.

It is still yet a further object, feature, and/or advantage of the present disclosure to provide a design for a multipurpose puller that attaches to the rotor and removes the rotor from the machine.

It is still yet a further object, feature, and/or advantage of the present disclosure to provide safer means of removing a rotor and/or attachments by having the ability to spin and tilt parts that are securely attached to the multipurpose puller without dropping them.

It is still yet a further object, feature, and/or advantage of the present disclosure to reduce risk of injury by allowing for a multipurpose puller that has the ability to remove rotors and other heavy parts that vary substantially in sizes and shapes. Some combines, for example, have different rotors and/or use different transition cones.

It is still yet a further object, feature, and/or advantage of the present disclosure to remove a combine rotor successfully by employing many large gussets to stiffen the structural members such that they are of adequate construction. The structural members are thick and use a higher yield strength material.

The multipurpose puller may be used to temporarily support the rotor if the puller is attached to the forklift while repair/maintenance is performed on the rotor. However, the multipurpose puller is preferably not designed to hold the rotor for an extended period of time. The multipurpose puller is also preferably not designed to transport the rotor any distance, especially on an uneven surface. The multipurpose puller is also preferably designed not to store or support the rotor for an extended period of time.

It is still yet a further object, feature, and/or advantage of the present disclosure to use a multipurpose puller that employs forks that support very high loads.

It is still yet a further object, feature, and/or advantage of the present disclosure to use a multipurpose puller that employs forks that have adjustable features that allow operators to modify the lifting angle or boom length.

It is still yet a further object, feature, and/or advantage of the present disclosure to not require the use of too many powered devices, that is to maximize the use of mechanical devices that require physical input. These devices include a binder, a plate that can be rotated, and an attachment that is under a load. However, it is to be appreciated that there will exist embodiments that can utilize powered devices if the operator is incapable of providing the necessary physical input; in such operations, an electric, pneumatic, or hydraulic cylinder can be used to perform the work.

The multipurpose puller disclosed herein can be used in a wide variety of applications. For example, parts that are dangerous to remove include but are not limited to, combine rotors, combine transition cones, and ag machinery dual wheels. The multipurpose puller can be used in many settings some of which include but are not limited to a large agricultural dealership, small repair shop, a farm shop, or other places where maintenance is performed on equipment.

It is preferred the apparatus be safe, cost effective, and durable. Rather than buy a whole new puller to remove another part, which would be a large capital expense, the multipurpose puller accommodates many different attachments. If attempts are made to remove these heavy parts employed crude methods or homemade tools, the parts being removed risk irreparable damage and the people performing the task risk injury and death. Even with the multipurpose puller described herein, certain precautions should be taken before and when using the multipurpose puller, such as (i) always inspecting the attachment before use to ensure it is in good working condition, (ii) following all safety guidelines provided by the manufacturer, (iii) using the attachment only for its intended purposes as outlined herein, (iv) never exceeding the attachment's maximum weight capacity, for example by referencing the sheet metal plate on the puller for the maximum work load; (v) keeping hands, feet, and loose clothing away from the moving parts, noting that pinch points can be flagged with indicia of danger; and (vi) never standing beneath the rotor puller. The multipurpose puller can also be adapted to resist excessive heat, static buildup, corrosion, and/or mechanical failures (e.g. cracking, crumbling, shearing, creeping) due to excessive impacts and/or prolonged exposure to tensile and/or compressive forces acting on the multipurpose puller.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the multipurpose puller.

Methods can be practiced which facilitate use, manufacture, assembly, maintenance, and repair of the multipurpose puller which accomplish some or all of the previously stated objectives.

One example method of installation comprises one or more of the following steps: (1) removing banding and packaging material, including hardware from a bag that includes a kit with all of the necessary components for said installation; (2) rotating the rotational plate upward, e.g. by using the rotating wheel hub as well as the chain binder to position the attachment correctly/flush to the rotor flights; (3) assembling a binder and attaching where needed, e.g. by tightening a nut and compressing a split washer, such that the unit is now ready to be attached to a forklift; (4) having the forklift on and in gear in order to hook up; (5) aligning the attachment with the forklift's forks and securing the attachment in place according to the manufacturer's instructions, e.g., there can be threaded t-handles that screw into the fork pocket and clamp the attachment to the forks, and there can also be a chain and a link that must be wrapped around the forklift and secured; and (6) double-checking that the attachment is properly secured before operation of the rotor puller. Preferably, during installation, the attachment should be able to spin; this is enabled in part due to the spring loaded plunger being engaged.

One example of a method of operation comprises one or more of the following steps: (1) familiarizing one's self with the controls of the forklift and the attachment; (2) always lifting and lowering loads smoothly and evenly to prevent instability; (3) avoiding sudden movements or sharp turns while carrying loads; (4) keeping a safe distance from obstacles and other workers while operating the forklift; (5) never using the attachment to lift people or allowing anyone to ride on it; (6) using provided 16 mm bolts, nuts and washers to secure rotor to attachment, fastening the rotor securely to attachment with proper bolt placement, and in the event elephant ears are left on while pulling the rotor, using longer bolts, such as 3.5" bolts; (7) maneuvering attachment via forklift up to the face of the rotor as in line with the rotor as possible; (8) sticking bolts (e.g. 16 mm bolts) with washers through the attachment into the rotor and thread on nuts as you go, while some adjusting with the wheel hub as well as the binder may be needed to allow holes to line up; (9) once nuts are loosely threaded onto the bolts, using an impact or ratchet to securely fasten all six of the bolts; (10) using the binder as well as the forklift to lift the rotor off of the concaves and driving sprocket in the rear; (11) slowly backing out and letting down the rotor during operation, minding wires and cab; and (12) avoiding running the forklift into the combine cab. When not in use, the multipurpose puller is ideally stored in a dry, secure location away from extreme temperatures and weather effects. If the multipurpose puller must be stored outside, a tarp should be used to protect it from the elements.

One example of a method of maintenance comprises one or more of the following steps: (1) regularly inspecting the attachment for signs of wear or damage such as cracked welds, bent plates, fault spring loaded plungers, and/or other components of the multipurpose puller; (2) occasionally applying grease to the wheel hub via a grease zerk; (3) keeping the attachment clean and free of debris; (4) inspecting bolts, nuts, and washer prior to use, and replacing same if those fasteners are bent, the threads are stripped, or they are otherwise damaged; and (5) if any issues arise during operation, ceasing use of the multipurpose puller and consulting a qualified technician for repairs.

One example of a method of manufacturing the multipurpose puller comprises: (1) gathering raw materials; (2) cutting the raw materials into parts with a machine such as a bandsaw or a CNC fiber laser; (3) sending the parts either to machining centers to be bored, to be drilled, or to wait in work in progress for the next step; (4) sending the parts either to a press brake to be formed or to wait in work in progress; (5) when all the parts have been processed and have been built to print, continuing the parts on to a weld area where they are placed in a fixture and wire welded; (6) after the welding process is completed, preparing the various subassemblies for paint and painting them using a 2 part epoxy paint; (7) organizing the subassemblies in one central location with hardware and other outsourced items and the unit is assembled; (8) torquing critical fasteners to spec; and/or (9) applying a serial tag. All throughout this manufacturing process, the parts are routinely inspected to ensure that they are made correctly and their features are within tolerance.

The multipurpose puller can be incorporated into systems or kits which accomplish some or all of the previously stated objectives.

According to some aspects of the present disclosure, a multipurpose puller comprises a frame, the frame having at least a pair of pockets parallelly arranged with one another, a chain having a threaded link that are capable of securing the multipurpose puller to a machine part, and a linear motion device that is fixed to the frame, the linear motion device being used to rotate a plate containing a bearing and a shaft forward and backward about a pin.

According to some additional aspects of the present disclosure, the multipurpose puller further comprises handles that clamp the multipurpose puller to forks of a forklift.

According to some additional aspects of the present disclosure, the multipurpose puller further comprises at least a spindle, the linear motion assembly allowing for the machine part to spin freely or be locked in multiple locations about the spindle so the machine part. A number of the multiple locations is twelve, radially and symmetrically arranged about the spindle. A fastener can mount and fix the machine part to the spindle. The fasteners comprise bolts. A tray can store the fasteners. A hub can accommodate at least eight bolts for securing said spindle.

According to some additional aspects of the present disclosure, the multipurpose puller further comprises a ratchet load binder that can adjust the orientation of a height or an orientation of the machine part. The frame, the plate, the pin, and the ratchet load binder are indirectly or directly attached to one other with a plurality of fasteners selected from the group consisting of: one or more hex head screws;

a locknut; a hex nut; a washer; an unthreaded bumper; and a socket head screw. The ratchet load binder is a gold-tip jaw-jaw ratchet load binder.

According to some additional aspects of the present disclosure, the multipurpose puller further comprises one or more cautionary labels to warn users of crushing or pinching.

According to some additional aspects of the present disclosure, the multipurpose puller further comprises a cone attachment that fits onto a transition cone of a combine. The cone attachment can comprise a tapered shape. Straps can attach to the cone attachment.

According to some other aspects of the present disclosure, a system comprises the multipurpose puller and pallet forks. The system can be selected from the group consisting of: (a) a forklift, (b) a skid loader, (c) a tractor; and (d) a telehandler.

According to some other aspects of the present disclosure, a kit can comprise the multipurpose puller and an attachment that is removably attached to heavy machinery, wherein the bearing and shaft that are fixed to the plate and allow the attachment to be spun three hundred sixty degrees. The attachment can be configured to remove a rotor for a combine. Alternatively, in lieu of the attachment described above, an alternative attachment can be used to remove wheels of a combine. To remove a wheel from a combine, the rotor attachment would need to be removed from the puller via bolt in the spindle and replaced with the wheel removing attachment.

These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

BRIEF DESCRIPTION OF THE DRAWINGS

Several embodiments in which the present disclosure can be practiced are illustrated and described in detail, wherein like reference characters represent like components throughout the several views. The drawings are presented for exemplary purposes and may not be to scale unless otherwise indicated.

An artisan of ordinary skill in the art need not view, within isolated figure(s), the near infinite distinct combinations of features described in the following detailed description to facilitate an understanding of the present disclosure.

DETAILED DESCRIPTION

The present disclosure is not to be limited to that described herein. Mechanical, electrical, chemical, procedural, and/or other changes can be made without departing from the spirit and scope of the present disclosure. No features shown or described are essential to permit basic operation of the present disclosure unless otherwise indicated.

As shown in FIGS. 1-6, the multipurpose puller 100 is a device that is compatible with any piece of machinery that has pallet forks attached to it or is able to have pallet forks attached to it. The machinery can comprise, but is not limited to comprising: a forklift, a skid loader, a tractor, and a telehandler.

Figure 7:
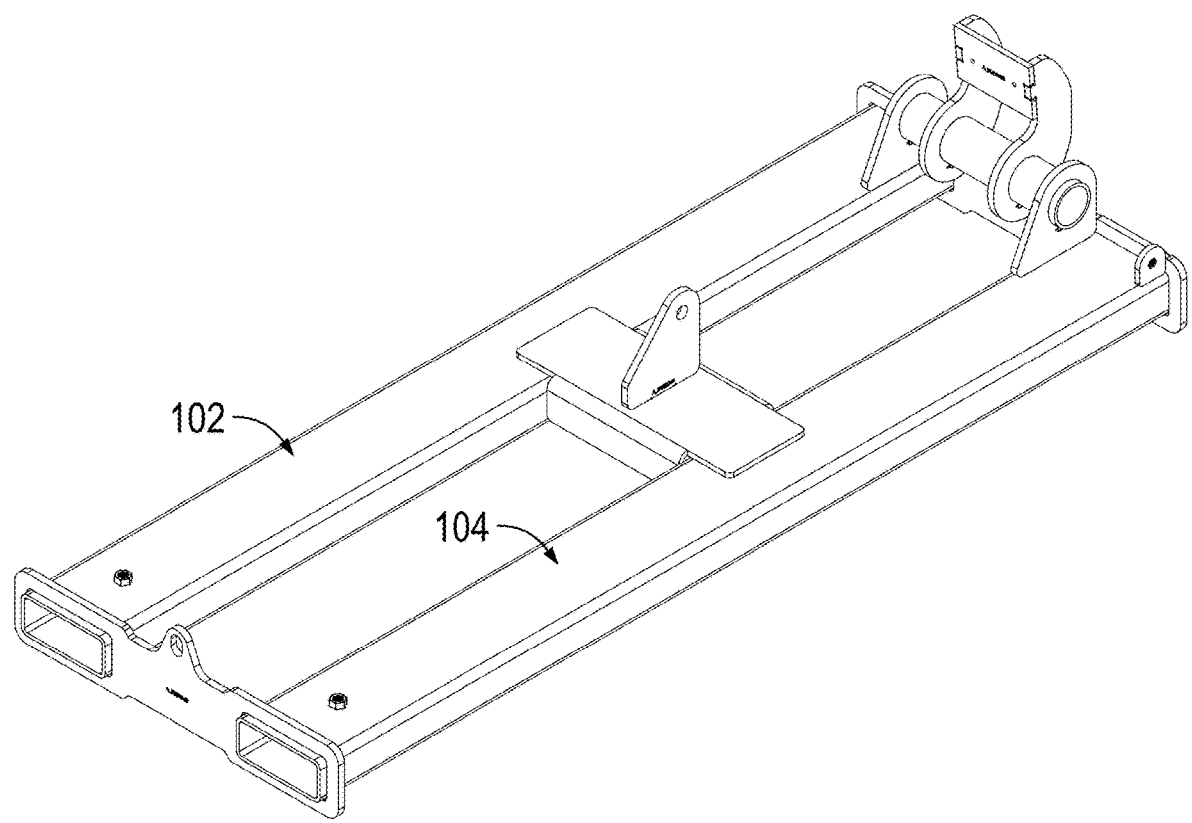
FIG. 7 shows a subassembly view of the rotor puller base of the multipurpose puller of FIG. 1.

The pockets 102, 104 (detailed component view: FIG. 7) are openings in the base of the multipurpose puller 100. The pockets 102, 104 allow forklifts to lift, balance, and secure large and heavy items safely. The piece of machinery which has the forks attaches to the pockets 102, 104 by inserting the forks thereinto. The pockets 102, 104 are located within the bottom side rails of the multipurpose puller 100, and are parallel to a center axis of the multipurpose puller 100, and in addition, run parallel to one another. The pockets 102, 104 allow forklifts to pick up and move the multipurpose puller 100 around warehouses and in the field.

Figure 8:
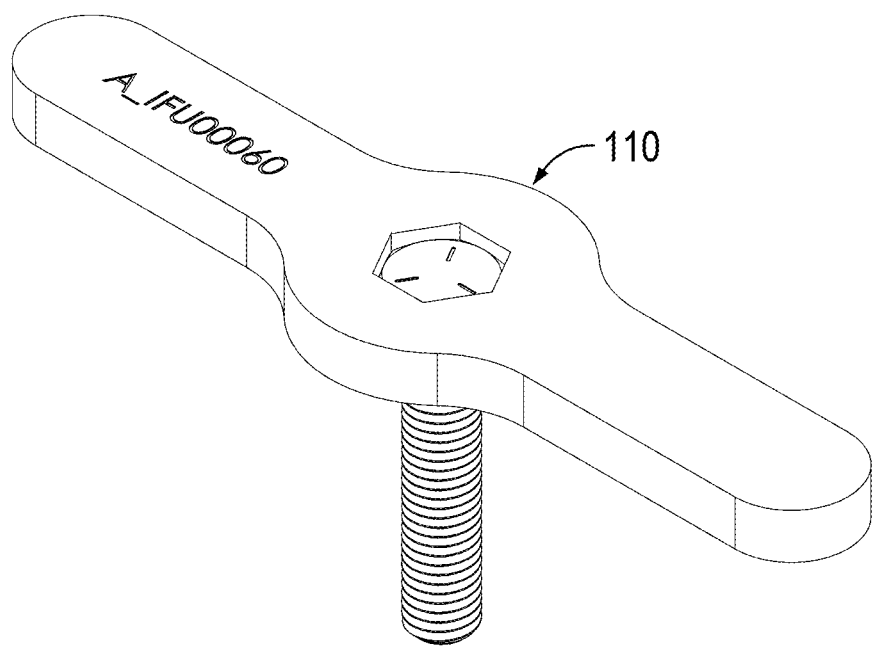
FIG. 8 shows a detailed component view of a rotor puller T-bolt of the multipurpose puller of FIG. 1.

A chain 106 with a threaded link 108 is used to secure the puller to the piece of machinery and fasteners with handles 110 (detailed component view: FIG. 8) are used as well to clamp the pockets 102, 104 of the multipurpose puller 100 to the forks. Once attached, the multipurpose puller 100 can be positioned where necessary with the piece of machinery.

The chain 106 helps secure a forklift by physically attaching the forklift or tow vehicle to the multipurpose puller 100. The chain 106 can also help prevent shifting or moving during transport of attachments 120, especially when traveling on slightly uneven roads. The chain 106 essentially acts as a tie-down to keep the forklift stable and secure against potential tipping or movement. Anchor points can be included on the multipurpose puller 100 for the chain 106 to be fastened to, ensuring a stronger hold. In some embodiments, to maintain stability, multiple chains can be used at different points on the multipurpose puller 100, distributing the load more evenly. Ideally, the chain(s) 106 are tightened securely to prevent any slack, which could allow the attachments and/or the multipurpose puller 100 to move during transport.

The threaded link 108, can be a quick link or hook which allows for a quick and secure connection that can be easily disconnected later. The threaded link 108 is fastened into a closed loop during securement, which creates a secure connection for the chain 106. In some embodiments, the threaded link 108 could also be used to help create more secure connections with objects other than chains, such as cables, ropes, or straps. Ideally, the threaded link 108 can be tightened with a minimum use of tools, such as with a wrench used for a tight hold.

The handles 110 provide a secure grip and allowing for extra torque to be applied by hand. The handles 110 are shown in the figures as rotatable horizontal bars, but it is to be appreciated the handles 110 could also be other rotatable members such as a star knob. The handles 110 are used to tighten, loosen, or adjust the securement of the pockets 102, 104 to the forks of a forklift without the need for extra tools. The handles 110 are ideally constructed from a strong material such as cast iron, aluminum, or stainless steel, which are durable and resistant to corrosion. The shape of the handles 110 are preferably ergonomic so as to reduce risk of injury to the user.

Figure 9:
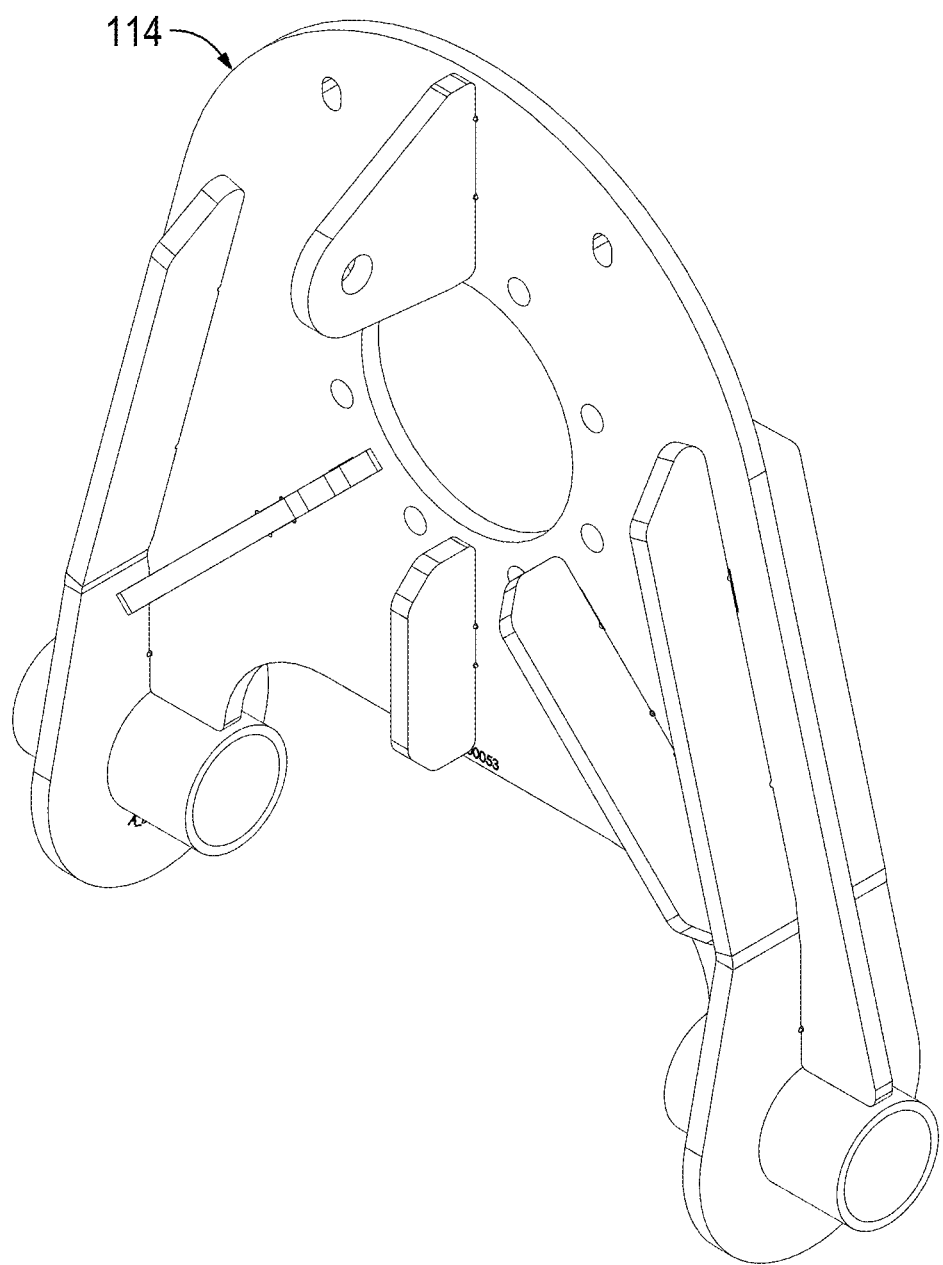
FIG. 9 shows a detailed component view of a rotational plate of the multipurpose puller of FIG. 1.

A linear motion device 112 that is fixed to the frame of the puller can be used to rotate the plate 114 (detailed component view: FIG. 9) containing a bearing and shaft 116 forward and backward about the pin 118. This enables the attachment 120 to be manipulated where desired in space, thereby making the removal and installation of large parts much easier.

As shown, the spindle is the rotating shaft 116. The spindle acts as an axle, mandrel, or arbor. The spindle is a critical component of the large machine tool, and supports, positions, and rotates tools and/or workpieces. The spindle described herein is primarily used for turning large and heavy parts. The spindle synergistically works with the bearing system and a drawbar mechanism. The shaft 116 can driven by a motor, and the bearing system supports the shaft 116 can be configured to reduce vibration. A drawbar mechanism holds the tool in place while the spindle is under load. Alternatively, the spindle can be powered pneumatically, instead of electrically. The size of the spindle can vary depending on the maximum load carrying capacity of the multipurpose puller 100. In the embodiment shown, the spins freely and is not powered by any device. The size of the spindle is also currently static and there are no sensors or monitoring systems. In alternative embodiments, the spindle can be equipped with small sensors and/or monitoring systems to prevent damage or failure and ensure optimal performance.

Figure 10:
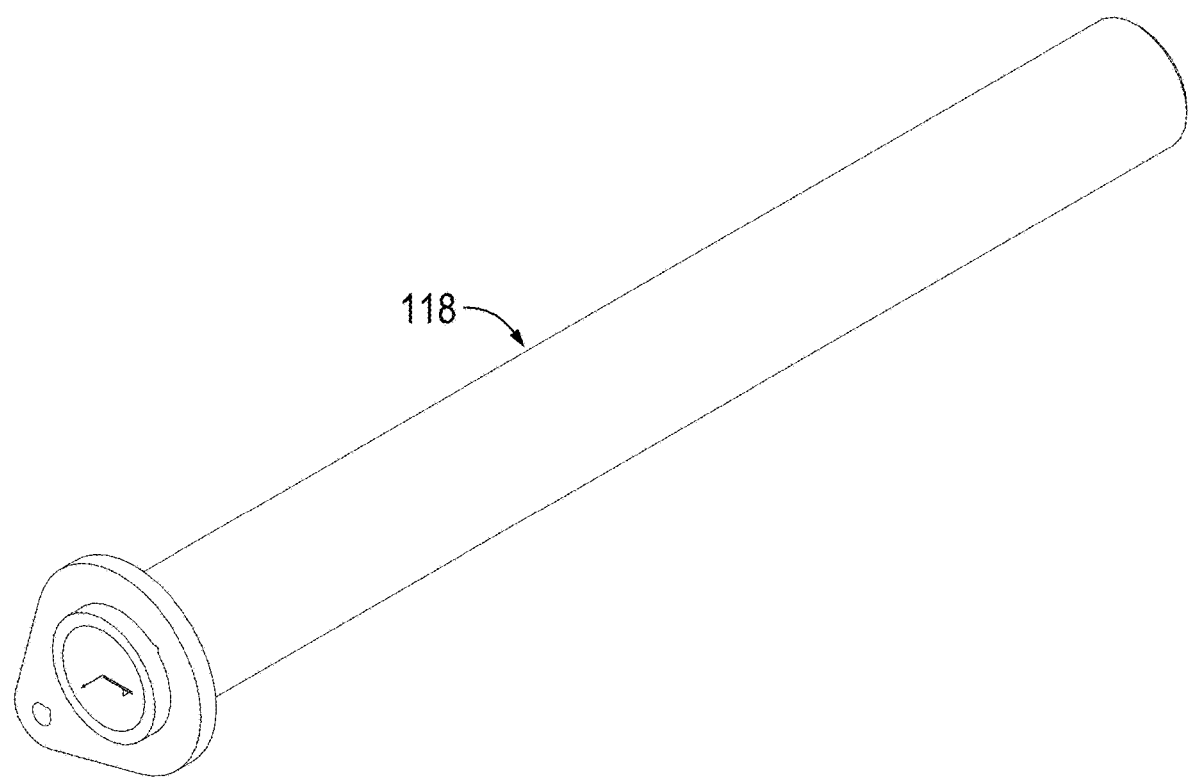
FIG. 10 shows a detailed component view of a hinge pin of the multipurpose puller of FIG. 1.

The hinge pin 118 (detailed component view: FIG. 10) is a heavy-duty metal rod that secures the multipurpose puller 100 to a forklift or a towing vehicle so that they do not separate. The hinge pin 118 rotates about a horizontal axis and connects the plate 114 to the base unit of the multipurpose puller and enables rotational motion. The hinge pin 118 does not connect the unit in its entirety to the forklift or a similar machine. The hinge pin 118 is preferably made from steel, stainless steel, black oxide, or some other sufficiently strong material. Optionally, the hinge pin 118 can include a retaining ring, a split pin, a threaded end, an internal thread, a set screw, a keyway, and/or a V-groove. Pin locks can be used to provide additional security/stability to the hinge pin 118 for the multipurpose puller 100.

Figure 11:
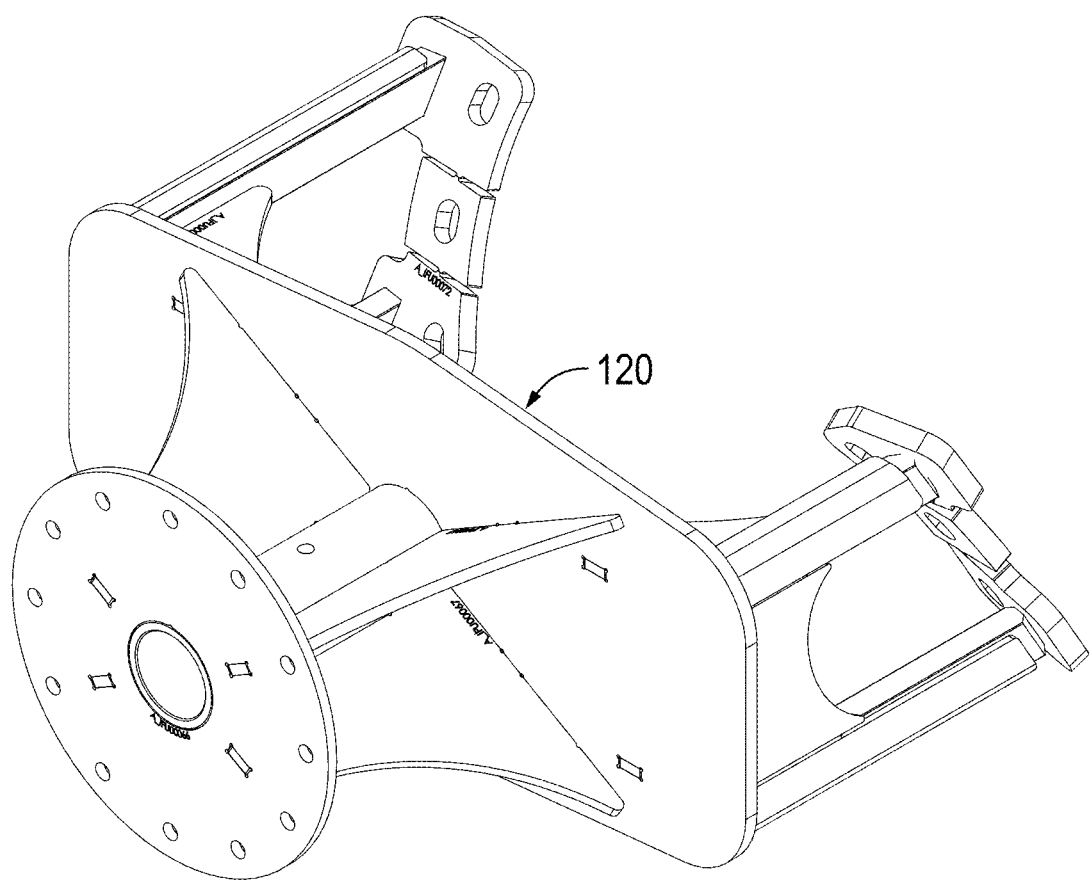
FIG. 11 shows a detailed component view of a rotor attachment of the multipurpose puller of FIG. 1.

The bearing and shaft that are fixed to the plate 114 allow the attachments 120 (detailed component view: FIG. 11) to be spun a full 360 degrees. Alternative embodiments can also be employed where the attachments are not allowed to be freely spun, and their range of motion may be limited to a lesser number of degrees such as only for 270 degrees, 180 degrees, or even just 90 degrees.

Also attached to the plate is a linear motion assembly 122 which is used to allow the attachments to spin freely or be locked in multiple locations about the spindle so the part being removed can be inspected or repaired. An endless list of manufactured attachments can be mounted and fixed to the spindle via a fastener 124. The fastener 124, in some embodiments, is a 4.5" long ½-13 bolt that helps securely connect the hub 132 to the mounting plates 160. Whichever part that is being removed from or installed into a piece of machinery is secured to the attachment 120 with fasteners of sufficient size and strength. When not in use these fasteners or other desired parts can be stowed in the stainless steel bolt tray 126.

Many processes, machines, and techniques are used to manufacture the multipurpose puller 100 as well as its attachments. First the raw materials are gathered and then they proceed to machines such as a bandsaw or a CNC fiber laser. Once the parts are cut on the bandsaw, the parts either go to machining centers to be bored, drilled, etc. Alternatively, the parts can wait in work in progress for the next step. After the parts are cut on the laser, the parts either go to a press brake to be formed or wait in work in progress. When all the parts have been processed and have been built to print, the parts continue on to a weld area where they are placed in a fixture and wire welded. After the welding process is completed, the various subassemblies are then prepared for paint and are painted using a 2 part epoxy paint. The subassemblies are then organized in one central location with hardware and other outsourced items and the unit is assembled. Critical fasteners are torqued to spec and a serial tag 128 is applied. All throughout this manufacturing process, the parts are routinely inspected to ensure that they are made correctly and their features are within tolerance.

Figure 12:
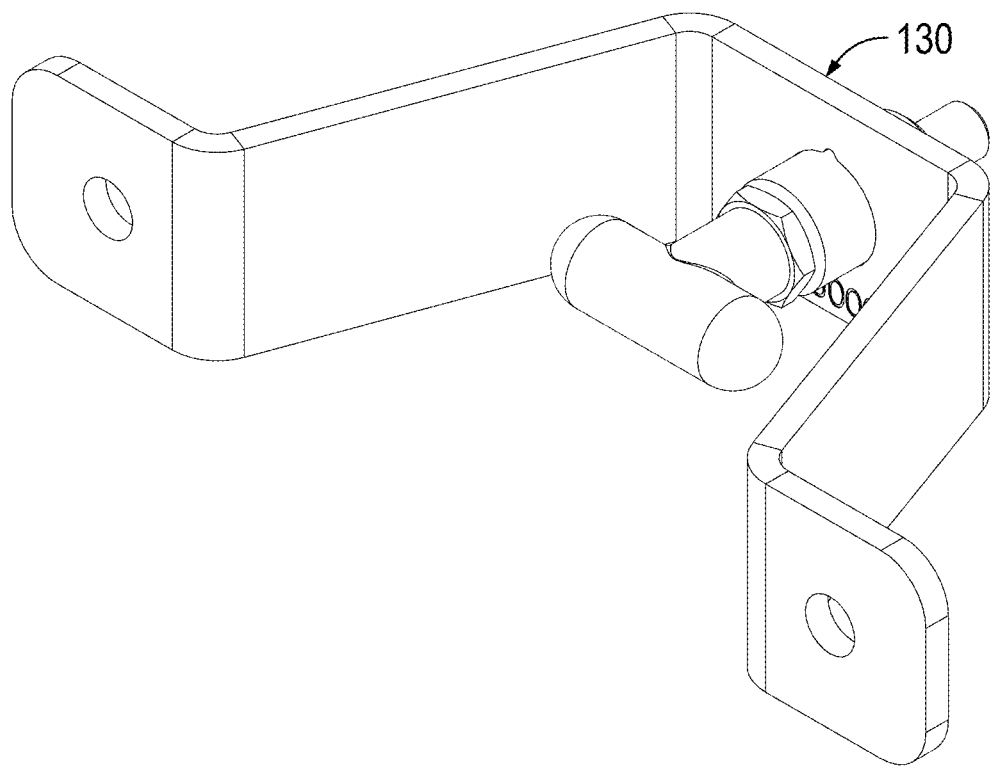
FIG. 12 shows a detailed component view of a rotor puller locking pin of the multipurpose puller of FIG. 1.
Figure 13:
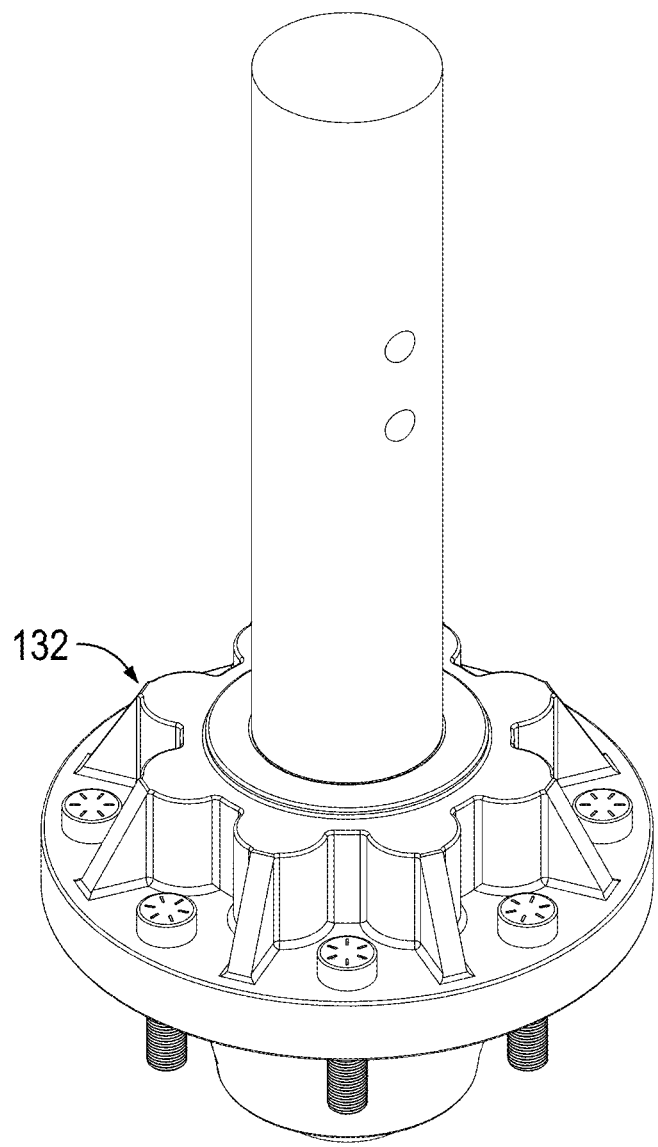
FIG. 13 shows a detailed component view of a hub of the multipurpose puller of FIG. 1.

The locking pin 130 (detailed component view: FIG. 12) locks the rotational plate 114 to the attachment 120. A hub 132 (detailed component view: FIG. 13) that includes the spindle (bearings and shaft) also allows the shaft to be place in a corresponding through hole in the attachment 120. The hub 132 includes eight through holes to further secure the rotational plate 114 to the attachment 120.

Figure 14:
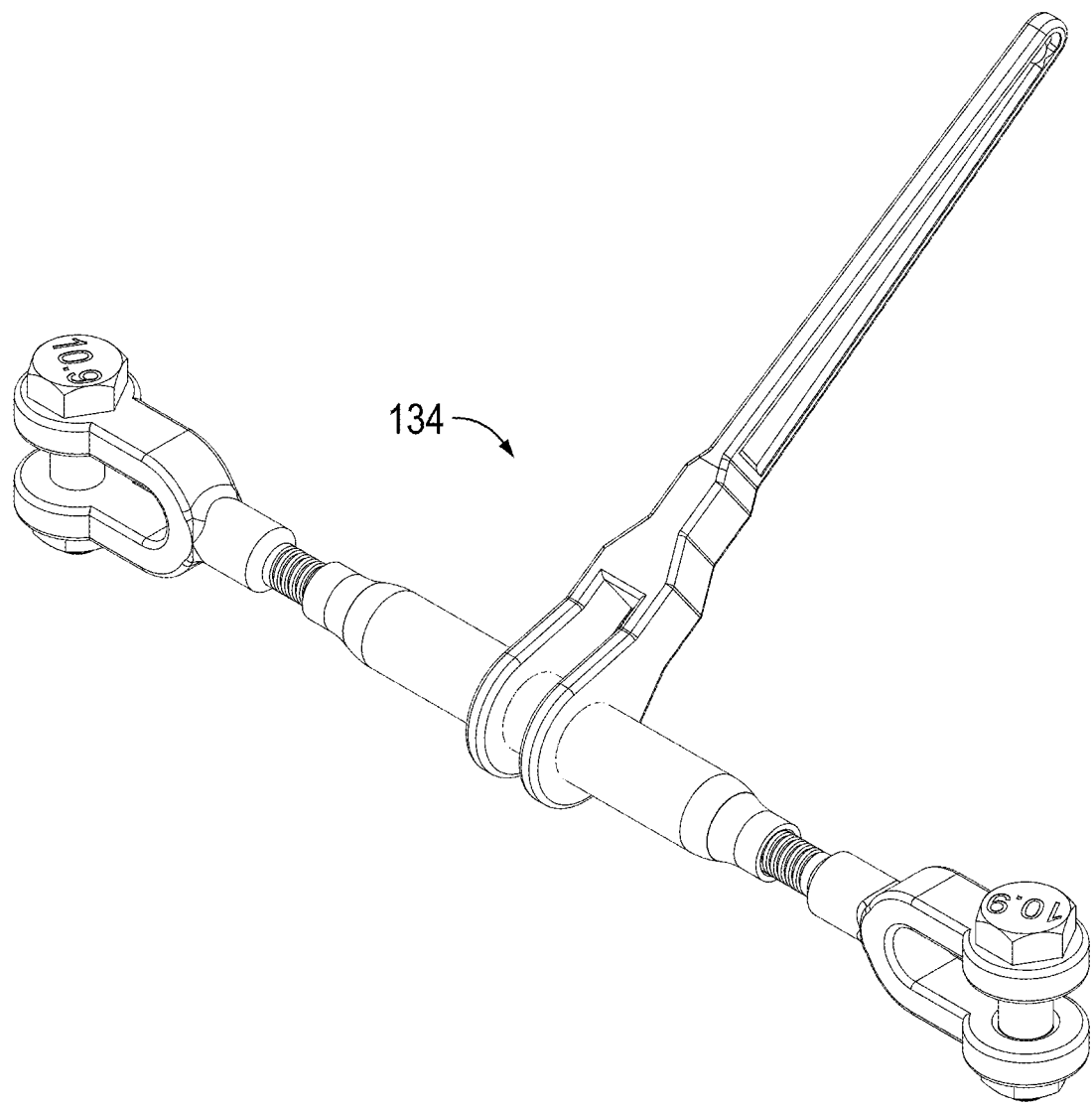
FIG. 14 shows a detailed component view of a gold-tip jaw-jaw ratchet load binder of the multipurpose puller of FIG. 1.

A ratchet load binder 134 (detailed component view: FIG. 14), also known as a ratchet chain binder, is used to secure cargo during transportation. The ratchet load binder 134 is preferably a gold-tip jaw-jaw ratchet load binder. The ratchet load binder 134 creates tension by cycling the lever back and forth, which turns screws that draw hooks toward the center of the binder. This adds tension to the chain and load. To secure the load, the lever and screw work together to increase the force applied to the tie-down assembly. The ratchet load binder is preferably to a lever binder because it is safer and do not require as much energy to be stored in the handle. This reduces the risk of the bar snapping back or recoiling. To use the ratchet load binder 134, the ratchet load binder 134 can be unscrewed until it is fully extended. The ratchet load binder 134 does not connect or utilize the chain 106. The ratchet load binder 134 connects to the subassembly that includes pockets 102, 104 as well as the rotational plate 114. The handle is then used is screw the jaws inward or outward to position the rotational plate 114 and in turn the attachment 120 into a desired space. The ratchet load binder 134 can be tightened by hand to take up any slack. The handle is then folded out and the pawl is turned until the pawl is in the "in" position. The load can then be ratcheted to the desired tension. A long baled lock is used to lock the chain to the binder.

The first hex head screw 136, which is shown in the figures as medium-strength grade 5 steel hex head screw, zinc plated, 0.375-16 thread size, 1.00 long, is used to secure the hinge pin 118 to the base so that the base will not creep out. The flange nuts 138, which are shown in the figures as grade 8 high-strength steel flange nut, zinc yellow chromate plated, ⅝"-18 thread, are used to secure the hub 132 to the rotational plate 114. Second hex head screw(s) 140 and locknut 144; which are shown in the figures as zinc yellow-chromate plated hex head screw, grade 8 steel, 0.5"-13 thread, 4.5" long, partially threaded and medium-strength steel serrated flange locknut, grade 5, zinc-plated, 0.50-13 thread size, respectively; help secure the rotational plate 114 to the locking pin 130. Third hex head screw(s) 142, which are shown in the figures as medium-strength grade 5 steel hex head screw, zinc plated, ½"-13 thread size, 1.5" long, help secure the locking pin 130 to the rotational plate 114. Fourth hex head screw(s) 146, hex nut(s) 148, and washer(s) 150, which are shown in the figures high-strength class 10.9 steel hex head screw, M16×2 mm thread, 75 mm long, and high-strength zinc-plated steel hex nut, class 10, M16×2 mm thread, and zinc-plated steel oversized washer for M16 screw size, 17 mm ID, 50 mm OD, respectively; help connect the rotor that is being removed to the attachment 120. Unthreaded bumper(s) 152 and socket head screws 154; which are shown in the figures as a heavy duty, SBR rubber, 1" OD, 9/16" high unthreaded bumper, and a black-oxide alloy steel socket head screw, ¼"-20 thread size, 1" long, respectively; are used as a cushion or stop for the rotational plate 114 in the event that the ratchet load binder 134 breaks or runs out of thread.

Figure 1:
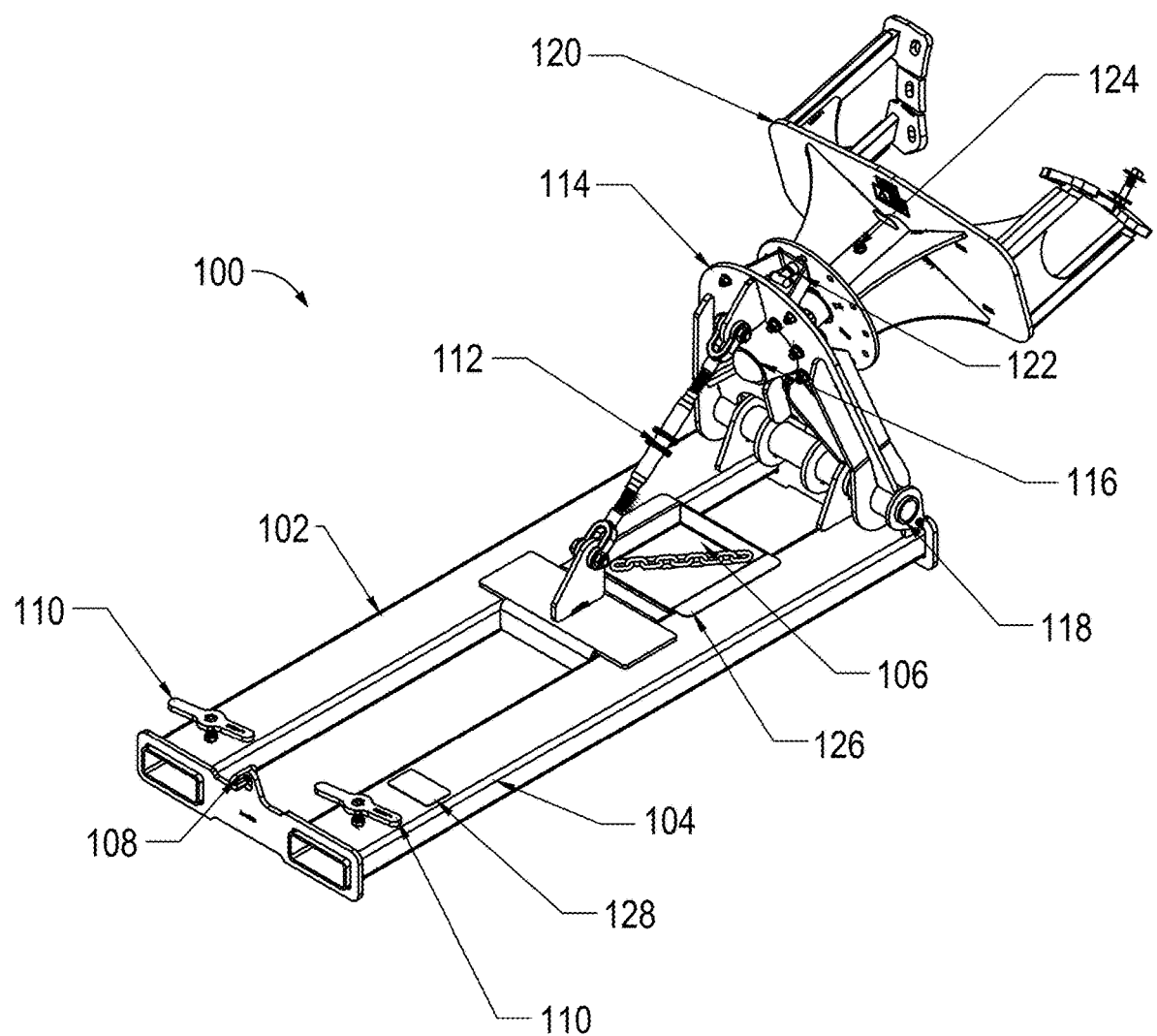
FIG. 1 shows a perspective view of a multipurpose puller.
Figure 2:
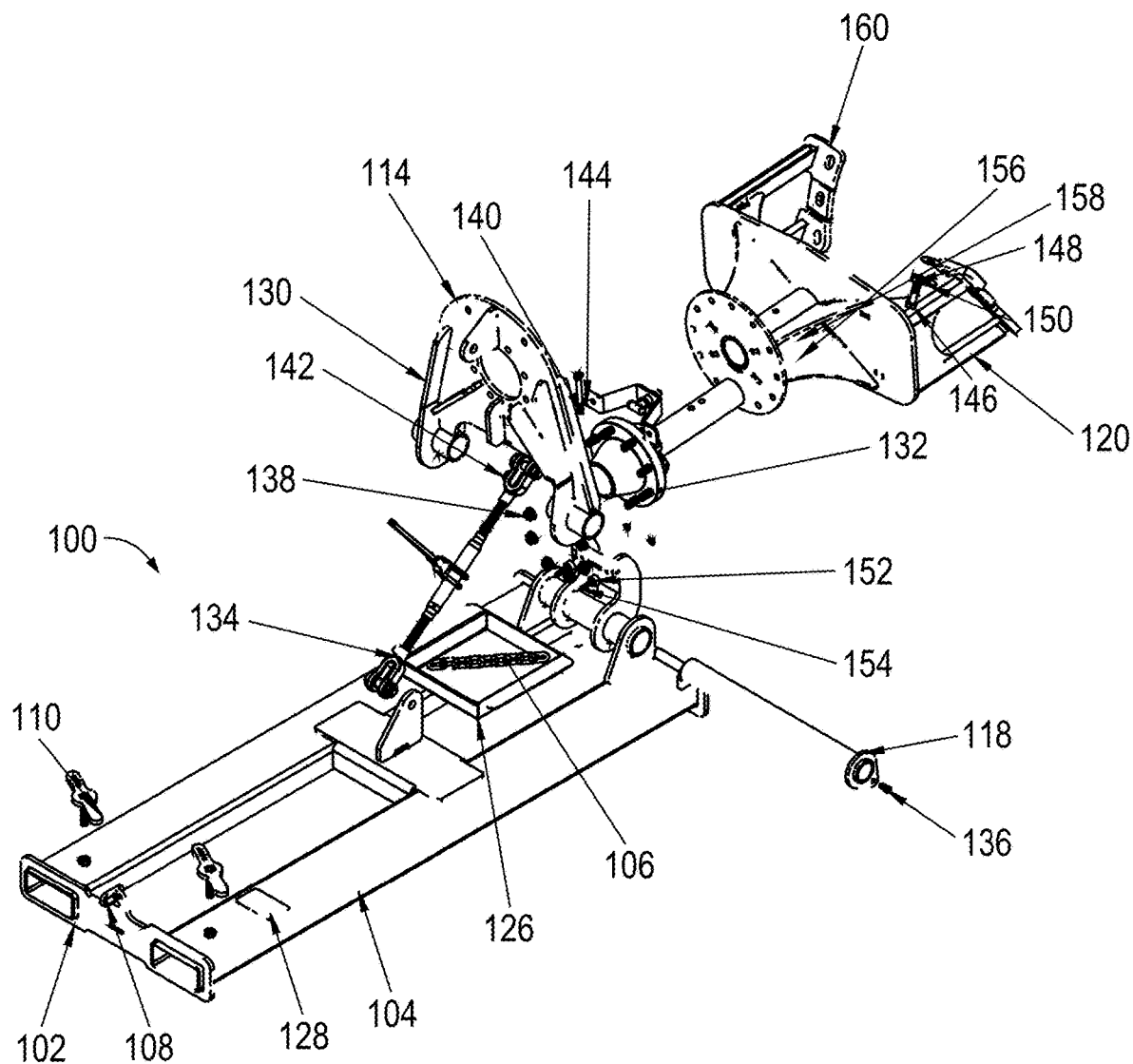
FIG. 2 shows an exploded view of the multipurpose puller of FIG. 1.
Figure 3:
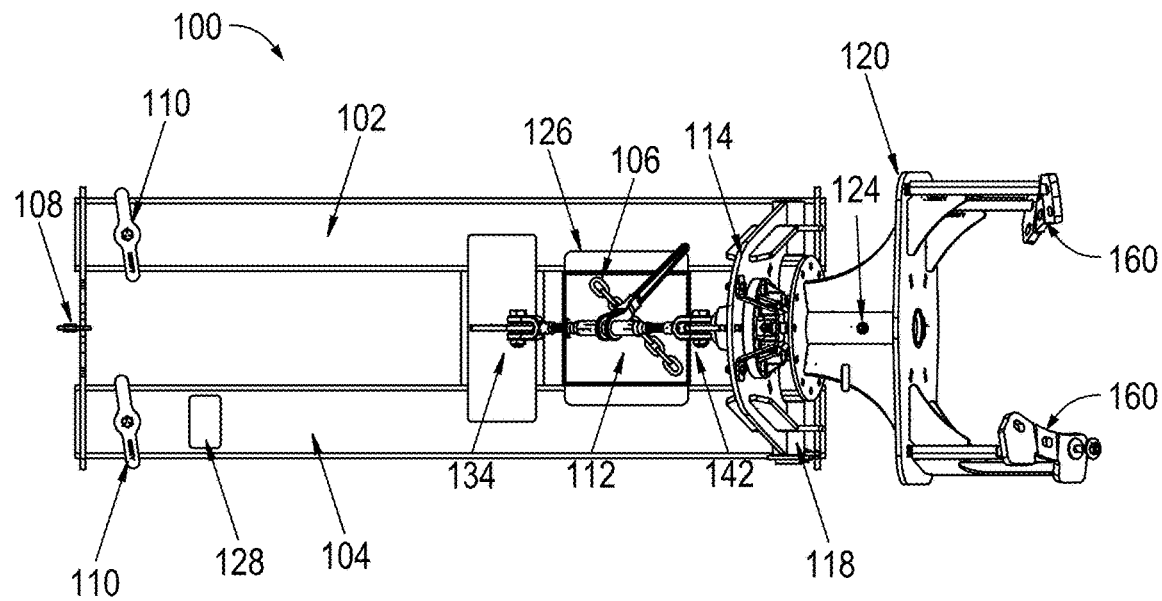
FIG. 3 shows a top plan view of the multipurpose puller of FIG. 1.
Figure 4:
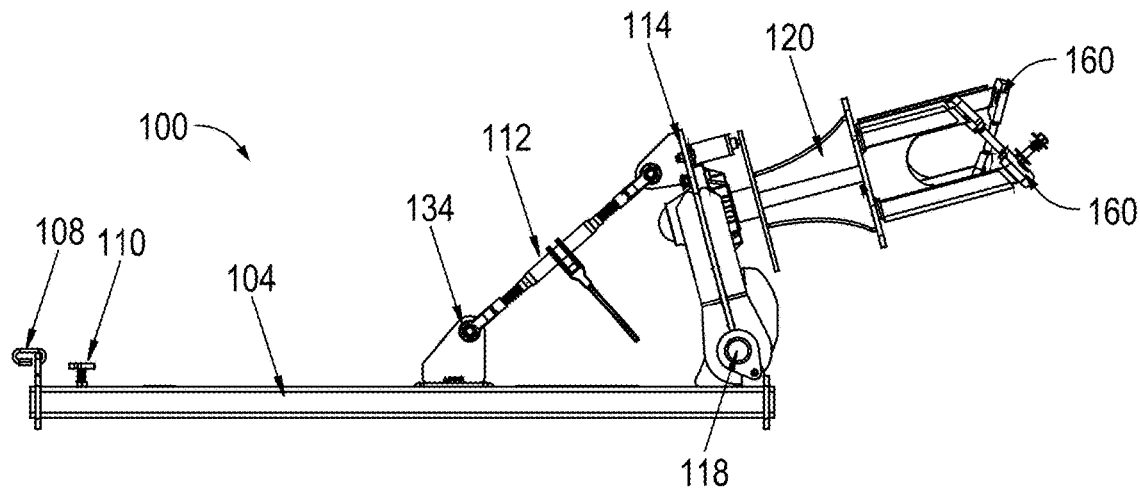
FIG. 4 shows a side elevation view of the multipurpose puller of FIG. 1.
Figure 5:
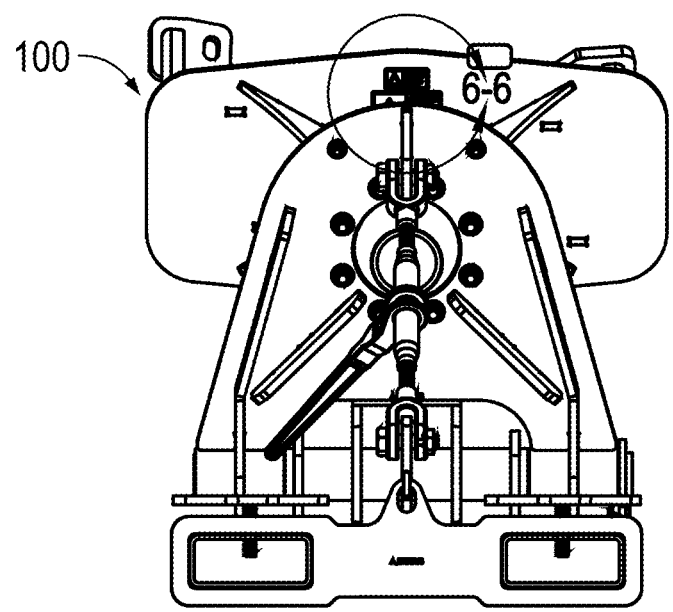
FIG. 5 shows a front elevation view of the multipurpose puller of FIG. 1.
Figure 6:
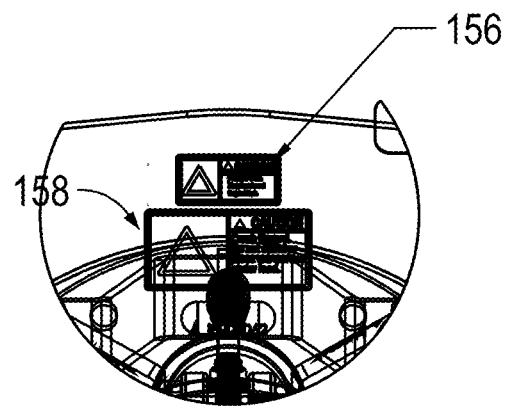
FIG. 6 shows a detailed view of the multipurpose puller of FIG. 1 within the detail bubble 5-5.

Cautionary labels 156, 158 (detailed component view: FIG. 6) can warn users of crushing and pinching, respectively. Other cautionary labels, such as those that warn users of entanglement, shearing, impacts, rollovers, exposure(s) to hazardous materials, electrical shock(s), and entrapment; all of which can lead to serious injuries or fatalities depending on the situation and the type of heavy machinery involved.

Figure 15:
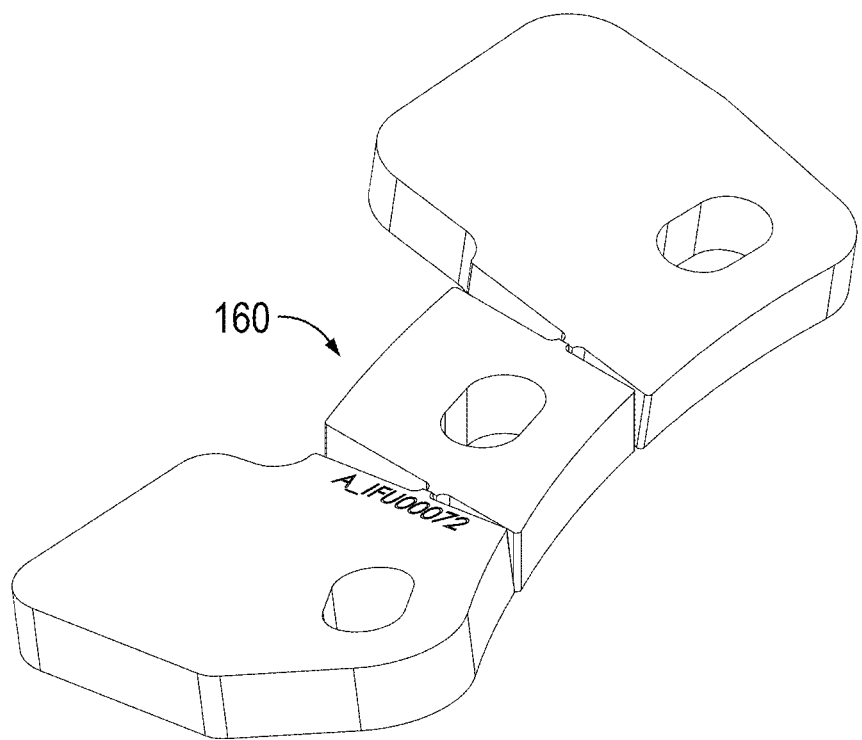
FIG. 15 shows a detailed component view of a mounting plate of the multipurpose puller of FIG. 1.

Multi-surfaced mounting plates 160 (detailed component view: FIG. 15) allows the attachment to secure into position in an internal location in the combine.

Figure 16:
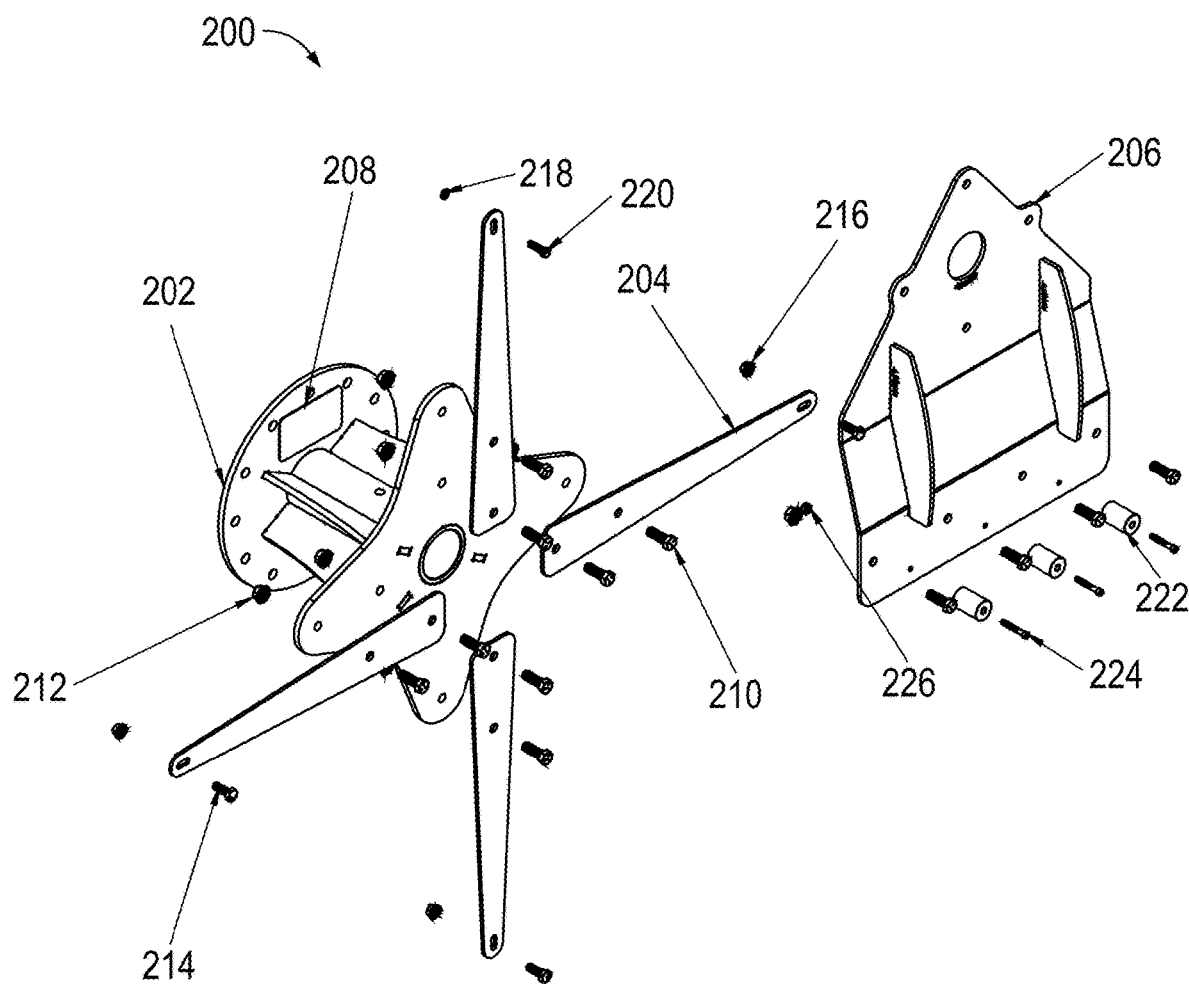
FIG. 16 shows an exploded view of a transition cone attachment of the multipurpose puller of FIG. 1.
Figure 17:
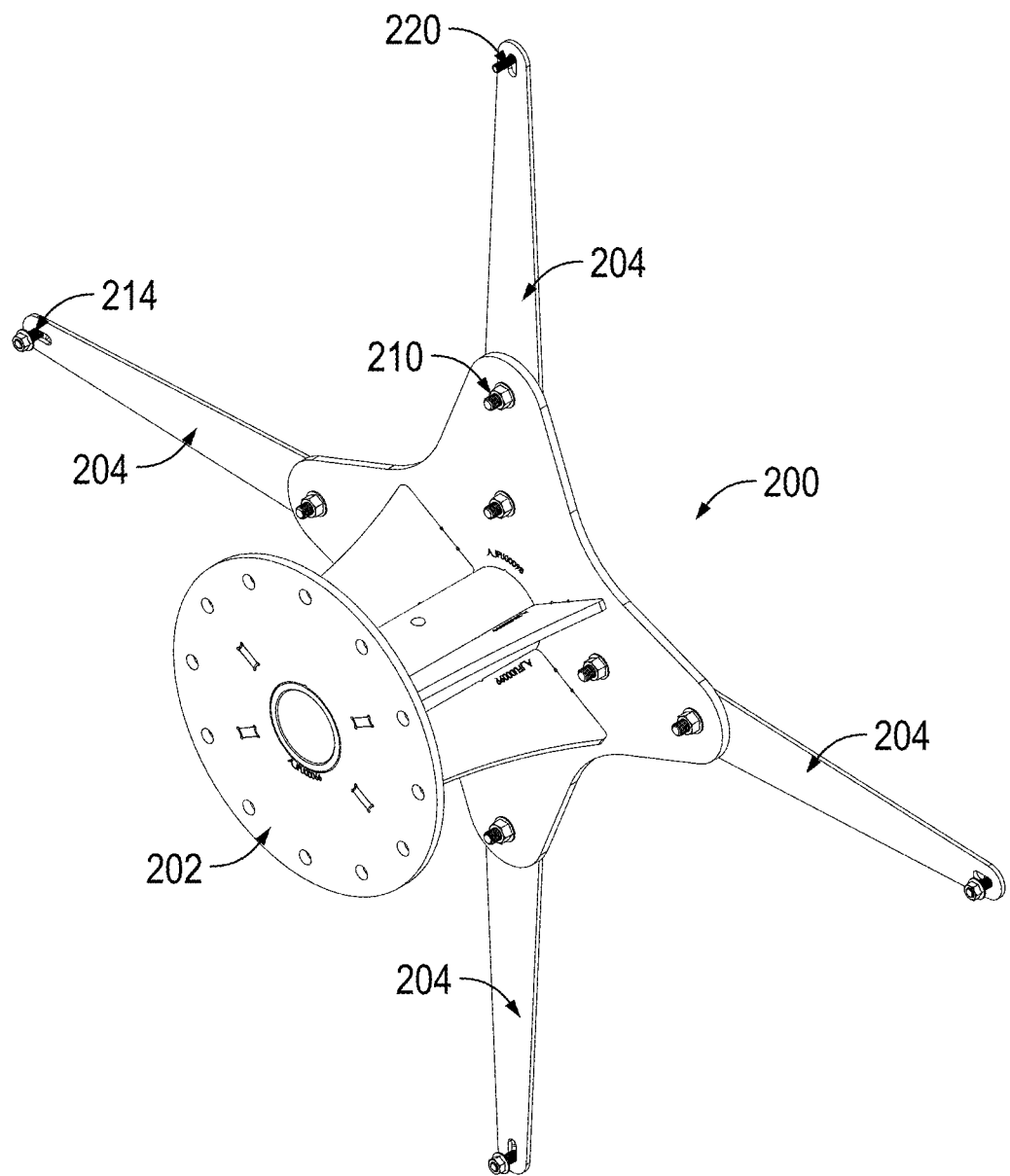
FIG. 17 shows a detailed component view of a first cone attachment of the multipurpose puller of FIG. 1.
Figure 18:
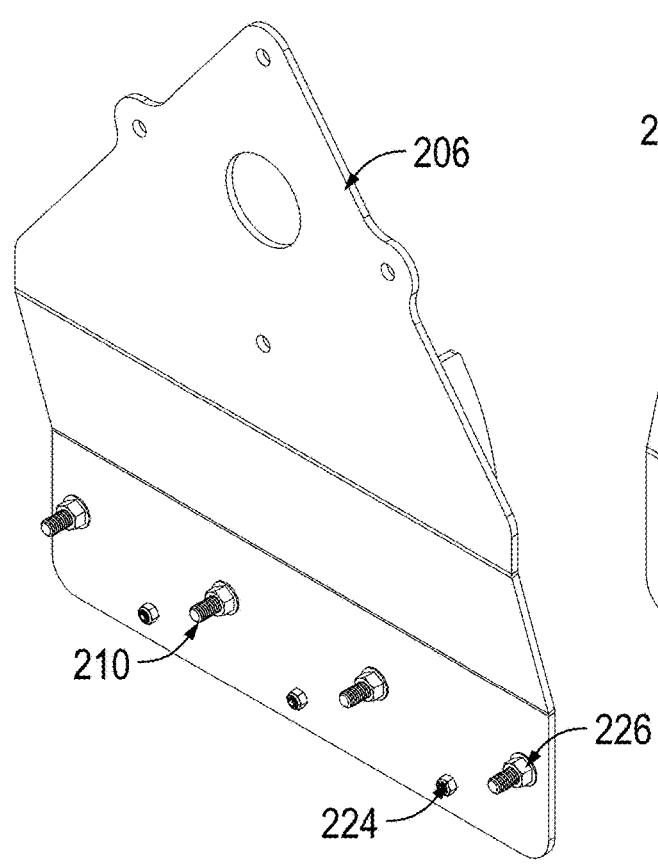
FIG. 18 shows a detailed component view of a front side of a second cone attachment of the multipurpose puller of FIG. 1.
Figure 19:
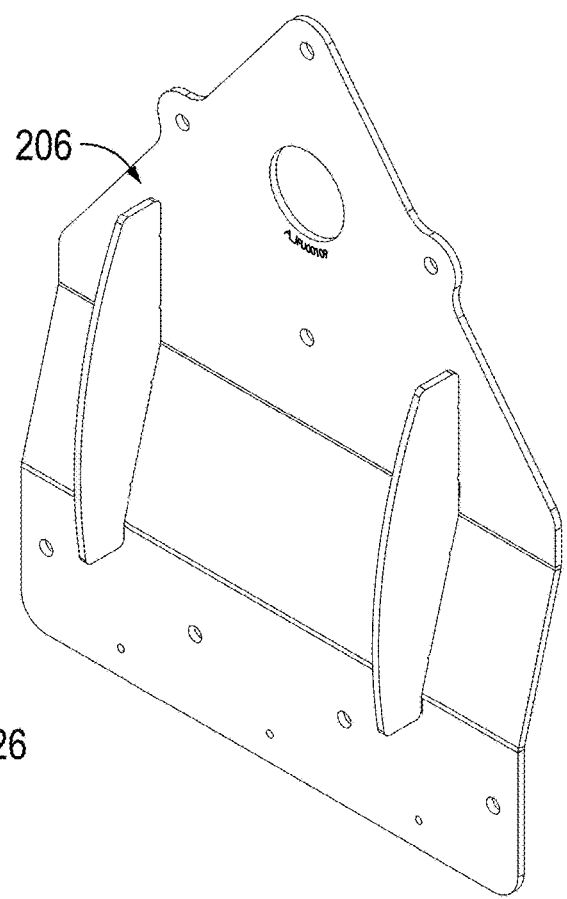
FIG. 19 shows a detailed component view of a back side of a second cone attachment of the multipurpose puller of FIG. 1.

FIGS. 16-18 show an attachment assembly 200. The attachment assembly comprises a first cone attachment 202, four straps 204 in a symmetrical radial arrangement, and a second cone attachment 206. The first cone attachment 202 in conjunction with the straps 204 or the second cone attachment 206 can be used in place of the attachment 120. The variation of the cone being removed or installed determines whether the first cone attachment 202 with the straps 204 or the second cone attachment 206 is used. The straps 204 primarily connect the cone to the first cone attachment 202. The straps 204 can further help provide support for heavy objects and the cone attachment.

The cone attachment 206 is a specialized tool that fits onto a combine's transition cone. The cone attachment 206 is used to remove a transition cone when maintenance or repairs are required. The transition cone is an internal component of the combine itself that is separate from the rotor and helps direct the grain in the threshing process, i.e., to funnel material into the rotor.

Optionally, a serial number plate 208 can be included. The serial number plate 208 can be a rating plate, data plate, placard, or nameplate, and can identify a product or piece of equipment and provides important information about it. The serial number plate 208 can be utilized for purposes of tracking, that is to help track assets throughout production, storage, and after sale; for example, the serial number plate 208 can include a variety of information, such as the manufacturer, model, serial number, manufacturing date, and more.

First hex head screw(s) 210 and first serrated flange locknut(s) 212; which are shown in figures as medium-strength grade 5 steel hex head screw, zinc-plated, ½"-13 thread size, 1.5" long) and medium-strength steel serrated flange locknut, grade 5, zinc-Plated, 0.50-13 thread size, respectively; help secure the cone attachment 202 to the straps 204 at an internal location. Second hex head screw(s) 214, second serrated flange locknut(s) 216, washer(s) 218, and third hex head screw(s) 220; which are shown in the figures high-strength class 10.9 steel hex head screw, blue-dyed zinc-plated, M10×1.5 mm thread, 30 mm long, medium-strength steel serrated flange locknut, class 8, zinc yellow-chromate plated, M10×1.5 mm thread size, a zinc yellow-chromate plated steel washer, grade 8, for M8 screw size, 8.4 mm ID, 15.0 mm OD, and zinc yellow-chromate plated steel hex head screw, high-strength, M8×1.25 mm thread, 30 mm long, fully threaded, respectively; help secure the straps 204 as an external, distal location of same. In other words, these items secure the transition cone that is being removed to the transition cone attachment (i.e., the first cone attachment 202 with the straps 204 or the first cone attachment 202 with the second cone attachment 206) that is doing the removing in conjunction with the multipurpose puller.

Unthreaded bumper(s) 222, socket head screw(s) 224, and nylon-insert locknut(s) 226, which are shown in the figures as an unthreaded bumper, heavy duty, SBR rubber, 1.25 inch OD, 1.88 inch high, a zinc-plated alloy steel socket head Screw, 0.25-20 thread size, 1.75 inch long, and a medium-strength steel nylon-insert locknut class 8, zinc plated, M8×1.25 mm thread, 8 mm high, respectively; are used in the connection between the first attachment 202 or second attachment 206 and the transition cone being removed that the first attachment 202 or second attachment 206 is directly attached to. These are used as supports as well as vibration dampening mechanisms.

From the foregoing, it can be seen that the present disclosure accomplishes at least all of the stated objectives. In other words, the multipurpose puller is complete and fully developed. That said, it is to be appreciated that the multipurpose puller as described herein captures embodiments which vary in some detail and vary only due to slight differences in accordance with manufacturer or consumer preference. The present disclosure thus expressly captures the use of the multipurpose puller with any such suitable attachments that vary in some details as well, so long as they can be used in conjunction with the base unit.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

List of Reference Characters 100 multipurpose puller
102 first pocket
104 second pocket
106 chain (e.g., high-strength grade 40/43 chain-not for lifting, unfinished steel, ⅜" trade size (36" cut length))
108 threaded link (e.g., oval-shaped threaded connecting link, zinc-plated steel, ⅜" thickness, 7/16" opening, not for lifting)
110 handles
112 linear motion device
114 rotational plate
116 shaft
118 hinge pin
120 attachment
122 linear motion assembly
124 fastener
126 catch-all tray (e.g. bolt tray)
128 serial tag
130 locking pin
132 hub (e.g., 8-bolt hub)
134 ratchet load binder (e.g., gold-tip jaw-jaw ratchet load binder)
136 first hex head screw(s) (e.g., medium-strength grade 5 steel hex head screw, zinc plated, 0.375-16 thread size, 1.00 long)
138 flange nut(s) (e.g., grade 8 high-strength steel flange nut, zinc yellow chromate plated, 5/16"-18 thread)
140 second hex head screw(s) (e.g., zinc yellow-chromate plated hex head screw, grade 8 steel, 0.5"-13 thread, 4.5" long, partially threaded)
142 third hex head screw(s) (e.g., medium-strength grade 5 steel hex head screw, zinc plated, ½"-13 thread size, 1.5" long
144 locknut (medium-strength steel serrated flange locknut, grade 5, zinc-plated, 0.50-13 thread size)
146 fourth hex head screw(s) (e.g., high-strength class 10.9 steel hex head screw, M16 × 2 mm thread, 75 mm long)
148 hex nut(s) (high-strength zinc-plated steel hex nut, class 10, M16 × 2 mm thread)
150 washer(s) (zinc-plated steel oversized washer for M16 screw size, 17 mm ID, 50 mm OD)
152 unthreaded bumper (e.g., a heavy duty, SBR rubber, 1" OD, 9/16" high unthreaded bumper)
154 socket head screw (black-oxide alloy steel socket head screw, ¼"-20 thread size, 1" long)
156 first label or warning (e.g. label for a caution pinch point)
158 second label or warning (e.g., label for a caution crush hazard)
160 multi-surfaced mounting plate
200 attachment assembly
202 first cone attachment
204 strap
206 second cone attachment
208 serial number plate
210 first hex head screw(s) (e.g., medium-strength grade 5 steel hex head screw, zinc-plated, ½"-13 thread size, 1.5" long)
212 first serrated flange locknut(s) (e.g., medium-strength steel serrated flange locknut, grade 5, zinc-Plated, 0.50-13 thread size)
214 second hex head screw(s) (e.g., high-strength class 10.9 steel hex head screw, blue-dyed zinc-plated, M10 × 1.5 mm thread, 30 mm long)
216 second serrated flange locknut(s) (e.g., medium-strength steel serrated flange locknut, class 8, zinc yellow-chromate plated, M10 × 1.5 mm thread size)
218 washer(s) (e.g., a zinc yellow-chromate plated steel washer, grade 8, for M8 screw size, 8.4 mm ID, 15.0 mm OD)
220 third hex head screw(s) (e.g., zinc yellow-chromate plated steel hex head screw, high-strength, M8 × 1.25 mm thread, 30 mm long, fully threaded)
222 unthreaded bumper(s) (e.g., unthreaded bumper, heavy duty, SBR rubber, 1.25 inch OD, 1.88 inch high)
224 socket head screw(s) (e.g., zinc-plated alloy steel socket head Screw, 0.25-20 thread size, 1.75 inch long)
226 nylon-insert locknut (e.g., medium-strength steel nylon-insert locknut class 8, zinc plated, M8 × 1.25 mm thread, 8 mm high)

Glossary

Unless defined otherwise, all technical and scientific terms used above have the same meaning as commonly understood by one of ordinary skill in the art to which embodiments of the present disclosure pertain.

The terms "a," "an," and "the" include both singular and plural referents.

The term "or" is synonymous with "and/or" and means any one member or combination of members of a particular list.

As used herein, the term "exemplary" refers to an example, an instance, or an illustration, and does not indicate a most preferred embodiment unless otherwise stated.

The term "about" as used herein refers to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variables, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order (e.g., first, second, third), a position, and/or an orientation are not limiting and are only referenced according to the views presented.

It will be understood that when an element is referred to as being "connected," "coupled," "mated," "attached," "fixed," etc. to another element, the element can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, terms such as (i) "communicatively connected" or (ii) "fluidly connected" include (i) all variations of information exchange and routing between two electronic devices, including intermediary devices, networks, etc., connected wirelessly or not and (ii) all variations of fluid exchange and routing between two fluidic bodies, including intermediary fluid paths, flows, etc., connected indirectly or not.

The "invention" is not intended to refer to any single embodiment of the particular invention but encompass all possible embodiments as described in the specification and the claims. The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. A multipurpose puller (100) comprising:
    a frame, the frame having at least:
        a pair of pockets (102, 104) parallelly arranged with one another;
    a chain (106) having a threaded link (108) that are capable of securing the multipurpose puller (100) to a machine part (120);
    a linear motion device (112) that is fixed to the frame, the linear motion device (112) being used to rotate a plate (114) containing a bearing and a shaft (116) forward and backward about a pin (118); and
a ratchet load binder (134) that can adjust the orientation of a height or an orientation of the machine part (120).

2. The multipurpose puller (100) of claim 1, further comprising handles (110) that clamp the multipurpose puller (100) to forks of a forklift.

3. The multipurpose puller (100) of claim 1, further comprising a linear motion assembly (122) comprising at least a spindle, the linear motion assembly (122) allowing for the machine part (120) to spin freely or be locked in multiple locations about the spindle so the machine part (120).

4. The multipurpose puller (100) of claim 3, wherein a number of the multiple locations is twelve, radially and symmetrically arranged about the spindle.

5. The multipurpose puller (100) of claim 3, further comprising a fastener (124) that mounts and fixes the machine part (120) to the spindle.

6. The multipurpose puller (100) of claim 5, wherein the fasteners (124) comprise bolts.

7. The multipurpose puller (100) of claim 5, further comprising a tray (126) for storing said fasteners (124).

8. The multipurpose puller (100) of claim 3, further comprising a hub (132) that accommodates at least eight bolts for securing said spindle.

9. The multipurpose puller (100) of claim 1, wherein the frame, the plate (114), the pin (118), and the ratchet load binder (134) are indirectly or directly attached to one other with a plurality of fasteners selected from the group consisting of:
one or more hex head screws (136, 138, 140, 142, 146);
a locknut (144);
a hex nut (148);
a washer (150);
an unthreaded bumper (152); and
a socket head screw (154).

10. The multipurpose puller (100) of claim 1, wherein the ratchet load binder (134) is a gold-tip jaw-jaw ratchet load binder.

11. The multipurpose puller (100) of claim 1, further comprising one or more cautionary labels (156, 158) to warn users of crushing or pinching.

12. The multipurpose puller (100) of claim 1, further comprising a cone attachment (206) that fits onto a transition cone of a combine.

13. The multipurpose puller (100) of claim 12, wherein the cone attachment (206) comprises a tapered shape.

14. A multipurpose puller (100) comprising:
a frame, the frame having at least:
a pair of pockets (102, 104) parallelly arranged with one another;
a chain (106) having a threaded link (108) that are capable of securing the multipurpose puller (100) to a machine part (120);
a linear motion device (112) that is fixed to the frame, the linear motion device (112) being used to rotate a plate (114) containing a bearing and a shaft (116) forward and backward about a pin (118);
a cone attachment (206) that fits onto a transition cone of a combine; and
straps (204) that attach to the cone attachment (206).

15. A system comprising:
the multipurpose puller (100) of claim 1; and
pallet forks.

16. The system of claim 13, wherein the system is selected from the group consisting of: (a) a forklift, (b) a skid loader, (c) a tractor; and (d) a telehandler.

17. A kit comprising:
a multipurpose puller comprising:
a frame, the frame having at least:
a pair of pockets (102, 104) parallelly arranged with one another;
a chain (106) having a threaded link (108) that are capable of securing the multipurpose puller (100) to a machine part (120);
a linear motion device (112) that is fixed to the frame, the linear motion device (112) being used to rotate a plate (114) containing a bearing and a shaft (116) forward and backward about a pin (118); and
an attachment (120) that is removably attached to heavy machinery, wherein the bearing and shaft (116) that are fixed to the plate (114) and allow the attachment (120) to be spun three hundred sixty degrees; and
a rotor for a combine.

18. The kit of claim 17, wherein the attachment (120) mounts to the shaft (116) via fasteners (124) so that the attachment (120) fits to wheels of a combine.

* * * * *